(12) United States Patent
Allen (10) Patent No.: US 11,375,554 B2
(45) Date of Patent: Jun. 28, 2022

(54) HUMAN TIME ALLOCATION AND MONETIZATION SYSTEM

(71) Applicant: The Influence Board, Inc., Littleton, CO (US)

(72) Inventor: Jay Allen, Englewood, CO (US)

(73) Assignee: The Influence Board, Inc., Littleton, CO (US)

(*) Notice: Subject to any disclaimer, the term of this patent is extended or adjusted under 35 U.S.C. 154(b) by 0 days.

(21) Appl. No.: 16/696,668

(22) Filed: Nov. 26, 2019

(65) Prior Publication Data

US 2020/0170050 A1 May 28, 2020

Related U.S. Application Data

(60) Provisional application No. 62/771,393, filed on Nov. 26, 2018.

(51) Int. Cl.
| | | |
|---|---|---|
| *G06Q 10/10* | (2012.01) | |
| *G06Q 10/06* | (2012.01) | |
| *G06Q 30/02* | (2012.01) | |
| *G06Q 10/00* | (2012.01) | |
| *H04W 74/08* | (2009.01) | |

(52) U.S. Cl.
CPC .. *H04W 74/0875* (2013.01); *G06Q 10/06311* (2013.01); *G06Q 10/1095* (2013.01); *G06Q 30/0279* (2013.01); *H04W 74/0891* (2013.01)

(58) Field of Classification Search
None
See application file for complete search history.

(56) References Cited

U.S. PATENT DOCUMENTS

| 8,209,310 | B1 * | 6/2012 | Metcalfe | G06Q 30/0207 |
| | | | | 707/705 |
| 2003/0078858 | A1 * | 4/2003 | Angelopoulos | G06Q 30/06 |
| | | | | 705/26.3 |

OTHER PUBLICATIONS

USPTO, 1826 The Abstract, 2014, USPTO MPEP, First Page (Year: 2014).*
Elise Keith, Measuring the Cost and Value of Meetings, 2012, Lucid Meetings Blog (Year: 2012).*
Elizabeth Warnke, Technical Writing for Software Documentation Writers, 2009, Kennesaw State University, paper 50, (Year: 2009).*

* cited by examiner

*Primary Examiner* — Hafiz A Kassim
*Assistant Examiner* — Zahra Elkassabgi
(74) *Attorney, Agent, or Firm* — Hall Estill Law Firm (57) ABSTRACT

In accordance with teachings of the invention, a system is provided to allocate meeting time to vendors. Various embodiments of the system allow for vendors to pay for the time of a busy person, such as an executive or professional. In embodiments of the invention, upon securing the time of a busy person with a successful meeting proposal, the proceeds from the meeting value are subsequently allocated to a charity selected by the executive or professional.

4 Claims, 9 Drawing Sheets

YOUR MEETING ACCEPTANCE CRITERIA

BE CLEAR WITH THE VENDORS ON YOUR AREAS OF NEED OR INTEREST, AS WELL AS WHAT YOU ARE NOT INTERESTED IN. YOU CAN IMPROVE THIS LIST OVER TIME AS YOUR NEEDS & INTERESTS CHANGE.

I AM INTERESTED IN:

> SOLUTIONS CAPABLE OF PROVIDING MEANINGFUL COST REDUCTIONS (20% OR MORE)
>
> NEW, INNOVATIVE IDEAS THAT PROVIDE MEANINGFUL ENHANCEMENTS IN CAPABILITY OR CUSTOMER SATISFACTION

I AM NOT INTERESTED IN:

> COMPANIES WE ARE ALREADY DOING BUSINESS WITH
>
> LARGE COMPANIES I'M ALREADY FAMILIAR WITH
>
> STAFFING SERVICES
>
> IT DEVELOPMENT SERVICES
>
> FINANCIAL SERVICES
>
> CONSUMABLES OR COMMODITY ITEMS

FIG. 2     1008

MEETING VALUE CALCULATOR

LET'S SEE WHAT OTHER EXECUTIVES LIKE YOU ARE GETTING FOR AN HOUR OF THEIR TIME!

SIZE OF COMPANY
ANNUAL REVENUE (IN MILLIONS)  [1,000 - 4,999 ▼]

SPAN OF CONTROL
HOW MANY PEOPLE REPORT TO YOU?  [50 - 99 ▼]

TITLE
SELECT THE TITLE THAT IS CLOSEST TO YOURS.  [VIP ▼]

OTHER EXECTIVES LIKE YOU ARE GETTING $750 FOR AN HOUR OF THEIR TIME DONATED TO CHARITY. USE THIS VALUE.

FIG. 3     1009

NEW MEETING REQUEST
THIS MEETING REQUEST WILL BE SENT TO JON DOE.
IF ACCEPTED, YOU AGREE TO PAY THE MEETING VALUE STARTED ABOVE, PLUS A 17% PLATFORM FEE.
[THREE THINGS TO KNOW ABOUT THIS AGREEMENT]

YOUR BOLD CLAIM
THIS IS YOUR OPPORTUNITY TO GIVE YOUR PITCH! CONSIDER THE BEST PRACTICES SHOWN ON THE RIGHT TO CREATE A COMPELLING BOLD CLAIM. THE TEXT US LIMITED TO 300 WORDS.

WORDS REMAINING: 300

ADD VIDEO
PASTE IN A VALID WEBSITE LINK.

ADD FILES
UPLOAD UP TO 3 FILES (MUST BE OF TYPE: .PDF, .DOC, .XLS, OR .PPT).

CHOOSE FILE   CHOOSE FILE   CHOOSE FILE

[SUBMIT REQUEST]   [CANCEL]

BEST PRACTICES
- BE AUDACIOUS. MAKE A "BRIEF, BUT BOLD, CLAIM" ABOUT YOUR ABILITY TO IMPACT THEIR COMPANY IN A MEANINGFUL WAY.
- CREATE INTRIGUE. FOCUS ON YOUR UNIQUE CAPABILITY - TELL THEM JUST ENOUGH TO MAKE THEM WANT TO KNOW MORE.
- GET MENTORING. STRESS THAT YOU ARE LOOKING FOR MORE THAN JUST A SALE - YOU NEED THEIR INPUT, ADVICE AND WISDOM.
- BE HUMAN - CONNECT ON A PERSONAL LEVEL. LEVERAGE THE VIDEO TO SHOW YOU AND YOUR PERSONALITY.

*FIG. 4*   1010

MAXIMUM ALLOWED MEETING REQUESTS PER MONTH

THIS IS THE MAXIMUM NUMBER OF MEETING REQUESTS YOU ARE WILLING TO "REVIEW AND STATUS" EACH MONTH (KEEP IN MIND THAT THE NUMBER OF MEETINGS YOU ULTIMATELY CHOOSE TO ACCEPT IS ENTIRELY UP TO YOU!).

- I DON'T HAVE TIME TO MEET THIS MONTH, BUT AM OPEN TO RE-EVALUATING NEXT MONTH.
- YOU DON'T FIT MY INTEREST CRITERIA TODAY, BUT MY NEEDS AND INTERESTS CHANGE OVER TIME, SO COME BACK AND LOOK AT MY PROFILE OFTEN.
- THIS ISN'T A FIT, AND NO FURTHER SUBMISSIONS DESIRED.
- OTHER

[DECLINE MEETING] [CANCEL]

HUMAN TIME ALLOCATION AND MONETIZATION SYSTEM

CROSS-REFERENCE TO RELATED APPLICATIONS

This application claims benefit under 35 U.S.C. 119(e) of U.S. Provisional Application Ser. No. 62/771,393, filed Nov. 26, 2018, which is hereby expressly incorporated herein by reference in its entirety.

BACKGROUND OF THE INVENTION

Busy people, including executives and professionals, typically remain overbooked and difficult to schedule. In particular, persons offering products and services have difficulty scheduling productive meetings to evaluate new product or service ideas. In many circumstances, this difficulty results even when both parties are interested and would likely benefit from such meeting.

Busy people are often also frustrated with repeated attempts by vendors to connect with them for items they have little or no interest in evaluating. Such busy people thereby feel that they are wasting their time to handle such entreaties and inquiries.

Vendors, on the other hand, who are seeking to deliver a useful product or service to a busy person, generally a prospective customer, have tremendous difficulty reaching him or her to make a value proposition pitch. Thus, many opportunities exist to improve the interaction between a vendor and a prospective client, particularly a busy professional or executive.

Busy people typically place a premium on their time. In their limited disposable time available to connect with vendors, many busy people would benefit from a system which could filter and prioritize unfamiliar vendor solicitations which would, in the normal course of business, be ignored or rejected without any reasonable assessment. For instance, many busy people would like to connect with vendors who may have the ability to offer a product or service that could benefit their respective businesses, but lack the ability to filter such items from unbeneficial products and services.

Likewise, many busy people have a desire to support charitable causes, but lack the personal funds needed to do all that they would like. Moreover, many busy people find that asking friends and associates for money represents an awkward and uncomfortable act. Busy people presently lack a standardized means to monetize their time or availability to directly support charities by leveraging the resources of third parties. Thus, a need to provide an additional context for busy people to support charitable causes without jeopardizing the allocation of their time to non-meaningful sources remains.

Vendors, in contrast, often have a strong incentive to pay for an audience with targeted executives and professionals. However, in most circumstances, it would be considered extremely inappropriate to attempt to pay money directly to an executive or professional to secure their time in the context of attempting to sell a product or service, particularly in instances where executives and professionals do not normally bill for their time. In some contexts, such an attempt would be considered a crude form of bribery or disallowed by the regulatory environment. As a result, vendors often suffer from a general difficulty or outright inability to secure time with busy executives and professionals.

Some platforms exist that offer auctions to efficiently value the time of a busy person for a charitable cause. However, some such platforms suffer from the inability to provide any relevant filtering and matching of the winning bidders interests to the interests of the person being auctioned.

Accordingly, a need remains to more efficiently allocate the time of busy people, including professionals and executives, to vendors (and others seeking the busy person's time), and a need remains to empower busy people with the ability to channel the resources of third parties to support charitable causes.

SUMMARY

In accordance with teachings of the invention, a system is provided to allocate meeting time to vendors. Various embodiments of the system allow for vendors to pay for the time of a busy person, such as an executive or professional. In embodiments of the invention, upon securing the time of a busy person with a successful meeting proposal, the proceeds from the meeting value are subsequently allocated to a charity selected by the executive or professional.

Embodiments of the invention comprises a Bold Claim, at least one Dashboard, Vendor Deflection, Meeting Value Calculator, Meeting Value Optimization Methodologies and an Executive Nominator.

The preferred embodiment of the System disclosed herein is described as a "Solicitation Management Platform System." As referred to herein, a "Solicitation Management Platform System" is defined as a system to provide a human with control over how the human allocates his or her time in response to one or more solicitations.

As used herein, the term "solicitation" refers to a request made by one human for a second human's time and attention with regard to a cause, product, purchase decision, advice, mentoring, conversation, including in-person, telephonic, or video chat conversation, or other expenditure of mental and/or physical energy by the second human.

In embodiments of the invention, the benefits generated resulting from implementation of the invention are specifically useful to a subset of humans, including without limitation executives, organizational decision makers, individuals who are pursued by persons making an unsolicited or unfamiliar offer, and/or other key influencers.

BRIEF DESCRIPTION OF THE FIGURES

The invention will be more fully understood from the following detailed description taken in conjunction with the accompanying drawings, in which.

DETAILED DESCRIPTION

Embodiments of the invention incorporate methods associated with achieving two objectives: the objective of organizing and separating vendor solicitations related to useful innovation from other solicitations, and the objective of monetizing engagement with executives for the benefit of charitable causes.

As used herein, the term "Executive User" refers to an influential decision maker within an organization, or alternatively a person tasked with deciding whether to consider a solicitation from a vendor and/or make a decision to accept a proposal related to a vendor solicitation. As used herein, the term "Vendor User" refers to a person who solicits or who wishes to solicit the sale of a product or service. As used herein, the term "System" refers to the platform utilized to accomplish the steps described herein, and further comprises the Platform website, website programming, software, software programming, third party software integration, general business processes and associated hardware necessary to operate the system in accordance with mechanisms and processes readily understood by one skilled in the art. In accordance with teachings of the invention, various messages are delivered by the System to one or more Vendor Users and one or more Executive Users via a display communicatively connected to the System and viewable by the one or more Vendor Users and the one or more Executive Users in accordance with mechanisms and processes readily understood by one skilled in the art. In accordance with teachings of the invention, various messages are delivered to the System by one or more Vendor Users and one or more Executive Users via input devices, which optionally may comprise a video camera and a keyboard, communicatively connected to the System and operable by the one or more Vendor Users and the one or more Executive Users in accordance with mechanisms and processes readily understood by one skilled in the art.

Figure 1A:
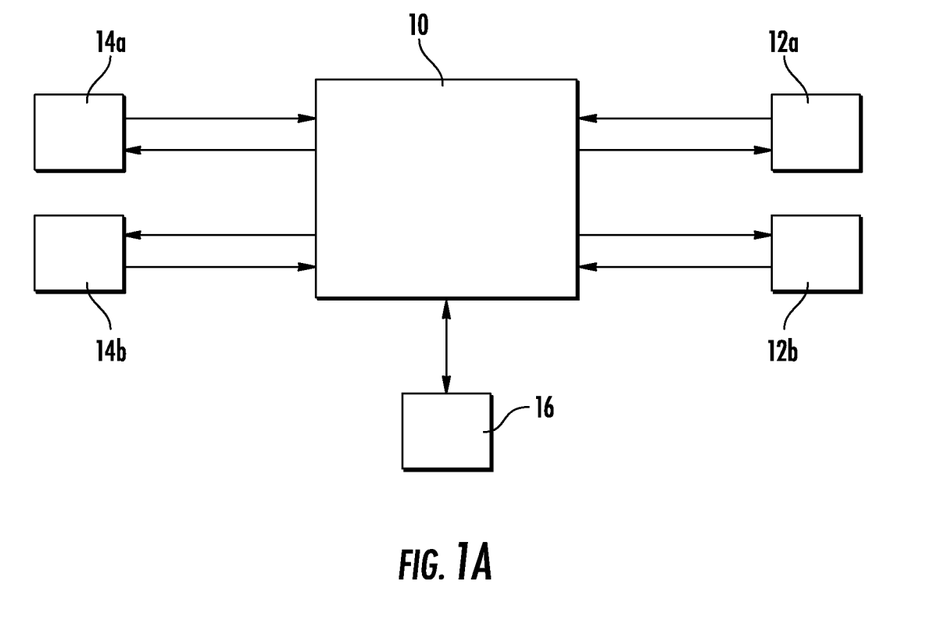
FIGS. 1a and 1b depict (a) a system and (b) a method for organizing and separating vendor solicitations related to useful innovations from other solicitations
Figure 1B:
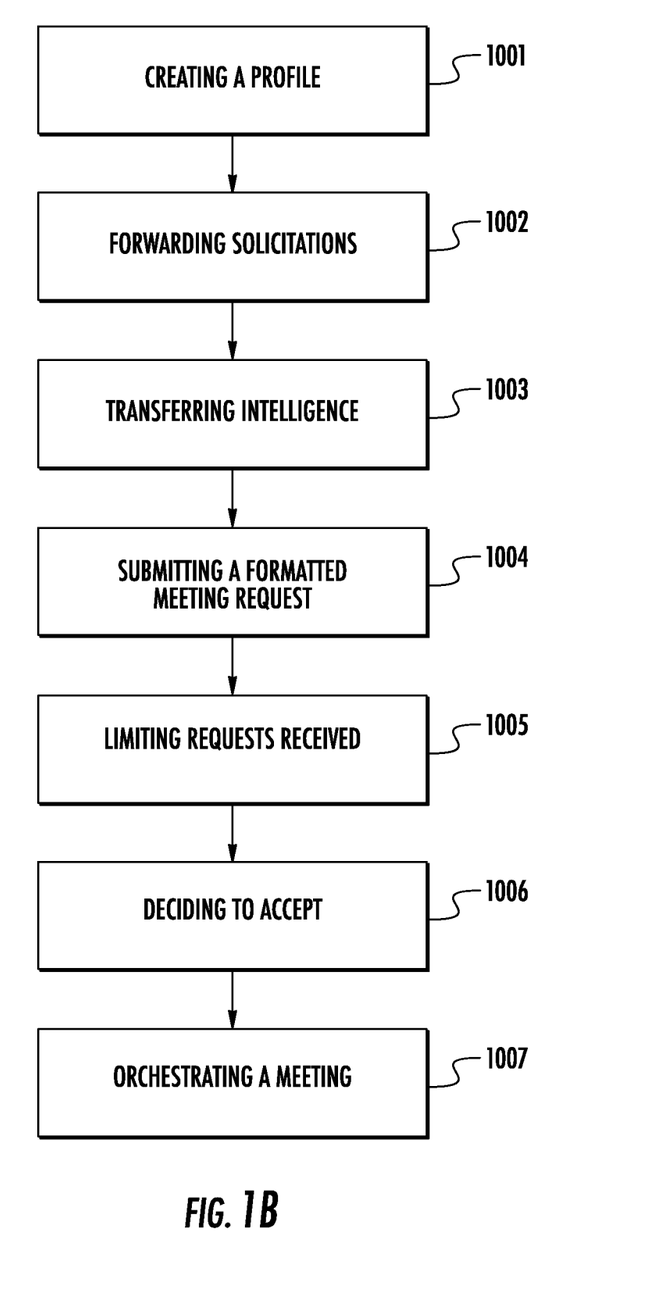

Referring to FIGS. 1-9, aspects of the present invention are directed to a system 10 and a method of organizing and separating solicitations related to useful innovation from other solicitations, and raising charitable donations through such method, comprising the following steps:

Creating a Profile. During the Creating a Profile step 1001, an Executive User 12 (a plurality of Executive Users 12a and 12b, in some embodiments) adds context-specific information to a profile stored by the System 10 related to the Executive User's 12 areas of need, interest, opportunity and desired innovation as it relates to improving business outcomes. This may also include areas of personal interest, educational needs, mentoring or advising interests, or any other category of desired interaction. During the Creating a Profile step 1001, the Executive User 12 also provides guidance on areas where no interest or need exists as a means to dissuade those who would request meetings related to those topics.

Forwarding Solicitations. During the Forwarding Solicitations step 1002, the Executive User 12 transfers solicitations received to the System 10 through various means such as forwarding an email, providing a URL over the phone, social media communications (such as through LinkedIn or other such platforms), or other means readily understood to one skilled in the art. The System 10 receives such transfers and provides an opportunity for the person who submitted the solicitation to become a Vendor User 14 on the system 10. Such opportunity arises via an invitation sent to the person who submitted the solicitation, said invitation sent via e-mail in the preferred embodiment. In an embodiment, the forwarding solicitation step further comprises deflecting vendors to the System 10 as an alternative to ignoring or deleting solicitation requests that would normally not be accepted or considered due to various reasons such as a lack of time to assess relevancy. Alternatively, deflecting vendors may take place following a determining on cursory assessment by an Executive User 12 that a particular Vendor User 14 does not seem to fit the Executive User's 12 needs or interests. The System 10 may optionally be configured to allow the Vendor User 14 a second opportunity to engage with the Executive User 12 by evaluating the Executive User's 12 stated needs and interests in the System 10 and subsequently submitting a more focused and relevant meeting request through the System 10. Embodiments of the invention are thereby configured to provide the ability, by simply forwarding an e-mail, to allow the System 10 to know which Executive User 12 participating in the system 10 sent the request. Embodiments of the invention are thereby configured to identify the Vendor User 14 from the email delivered by the Executive User 12, thus empowering the System 10 to automatically engage in a dialogue via email or other methods with the Vendor User 14 to communicate the System 10 capability and encourage them to participate through the System 10 in meeting requests for any of the various Executive Users 12 within the System 10.

Figure 2:
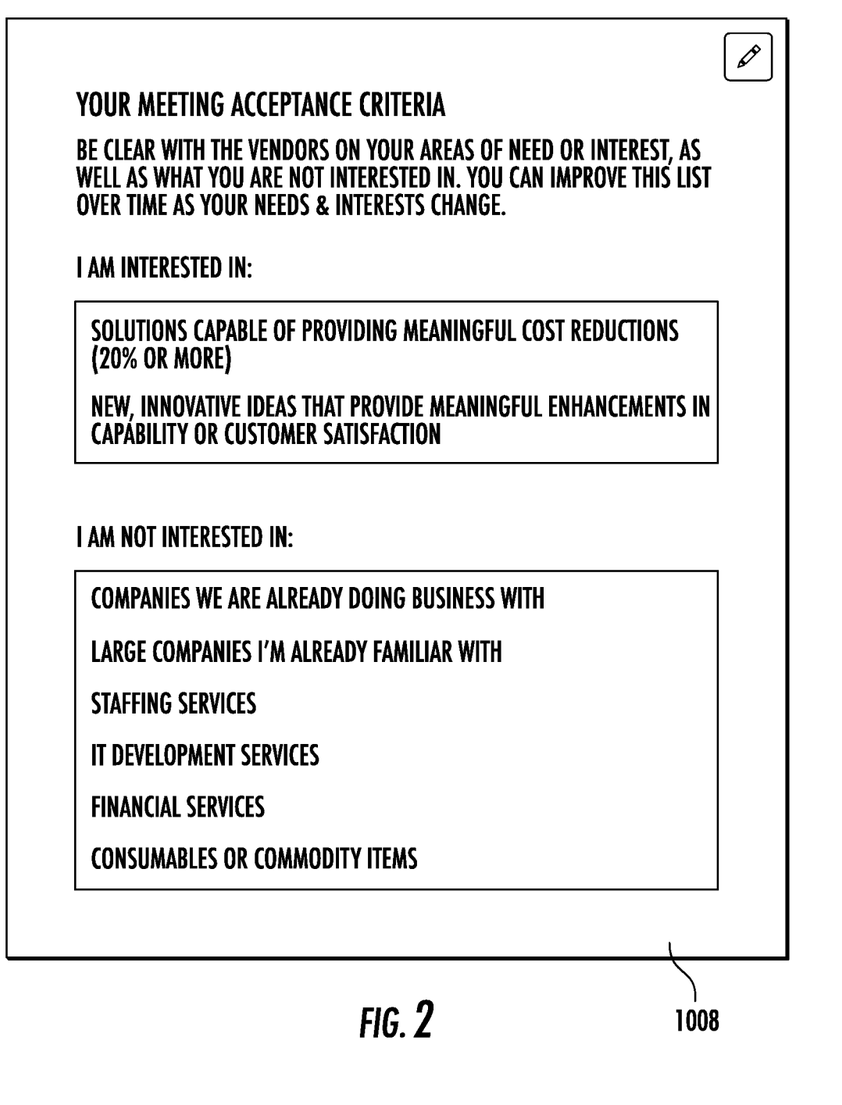
FIG. 2 depicts a Meeting Acceptance Criteria Selector in an embodiment of the invention.

Transferring Intelligence. During the Transferring Intelligence step 1003, the System 10 provides Vendor Users 14 with meeting relevancy information for an Executive User 12. The meeting relevancy information includes intelligence on the Executive User's 12 areas of need, interest, opportunity and desired innovation as it relates to improving business outcomes. Such information derives from information provided by the Executive User 12 during the Creating a Profile step 1001. Such information may include areas of personal interest, educational needs, mentoring or advising interests, or any other category of desired interaction from the soliciting community. The Executive User 12 also provides guidance on areas where no interest or need exists as a means to dissuade those who would request meetings related to those topics during the Creating a Profile step 1001, which is provided to a Vendor User 14 during the Transferring Intelligence step 1003. In an embodiment of the invention, the meeting relevancy information is selected by an Executive User 12 via the Meeting Acceptance Criteria Selector 1008 as depicted in FIG. 2.

During the Transferring Intelligence step 1003, the meeting relevancy information displayed by the System 10 may include a previous Vendor User's 14 rankings of a specified Executive User 12. The meeting relevancy information may include an Executive User's 12 rankings of previous meetings with a Vendor User 14. The Executive User 12 rankings include text form input containing a Vendor User's 14 insights on the specified Executive User 12 in an embodiment. The Vendor User 14 rankings include one or more Executive User's 12 text form input containing an Executive User's 12 insights on positive and negative interactions with a specified Vendor User 14 in an embodiment. The System 10 displays meeting relevancy information to a Vendor User 14 to enhance guidance to the Vendor User 14 to assist the Vendor User 14 in deciding whether to submit a meeting request with a particular Executive User 12. The meeting relevancy information displayed by the System 10 to a Vendor user 14 is also intended to assist the Vendor User 14 in determining how best to position himself or herself to obtain the meeting with a specified Executive User 12 and how best to present during the meeting to best utilize their time with the Executive User 12.

Figure 3:
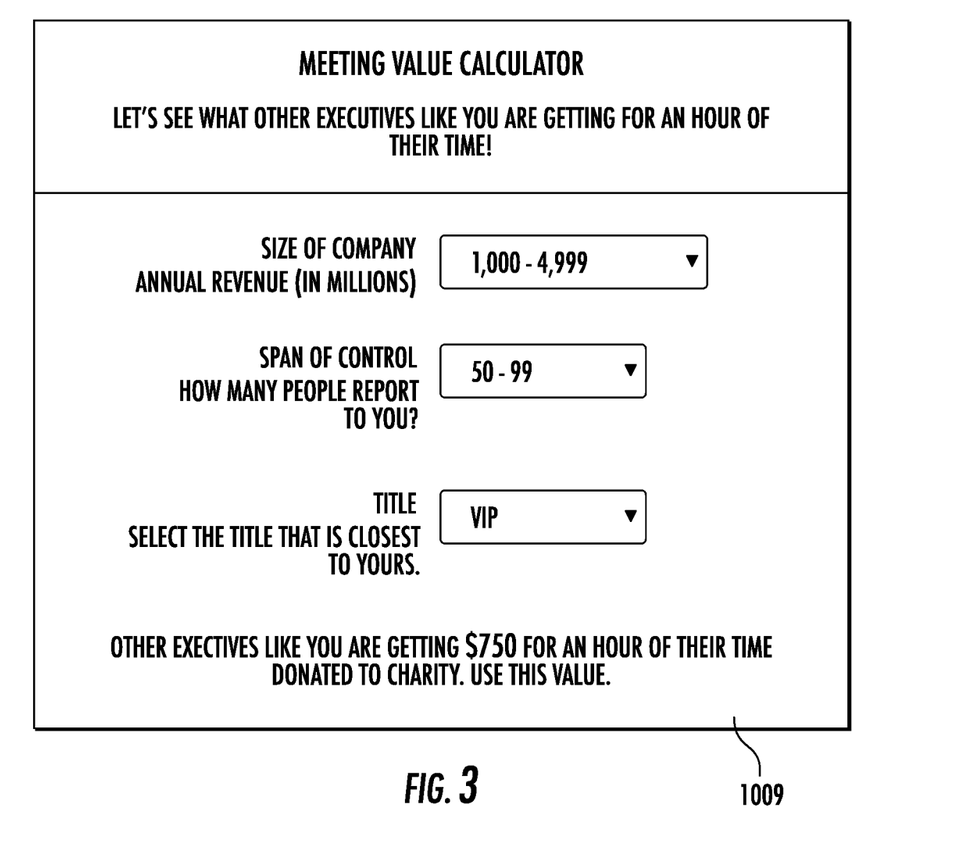
FIG. 3 depicts a Meeting Value Calculator in an embodiment of the invention.

Meeting Value Calculator. During the Transferring Intelligence step 1003, to assist an Executive User 12 in determining the value that might be derived from an hour of that Executive User's 12 time to support a charitable cause, the System 10 provides a Meeting Value Calculator 1009 to the Executive User 12. In an embodiment, the Meeting Value Calculator 1009 incorporates inputs such as "title," "span of control," and "size of company." Such inputs are intended to assist the Executive User 12 with guidance with relation to the meeting value that the Executive User 12 should ask for when accepting a meeting request from a Vendor User 14. In an embodiment of the invention, the Meeting Value Calculator 1009 is provided as depicted in FIG. 3.

Meeting Value Optimization. During the Transferring Intelligence step 1003 in the preferred embodiment, the System 10 helps the Executive User 12 navigate to an optimized meeting value based on demand. To optimize an Executive User's 12 time value, the System 10 monitors demand by tracking the speed at which the Executive User 12 receives the maximum meeting requests allowed by the Executive User 12 for the month. The System 10 further provides suggestions to the Executive User 12 relative to increasing or reducing that Executive User's 12 meeting value to increase or decrease demand to optimize their charitable giving capability.

Figure 4:
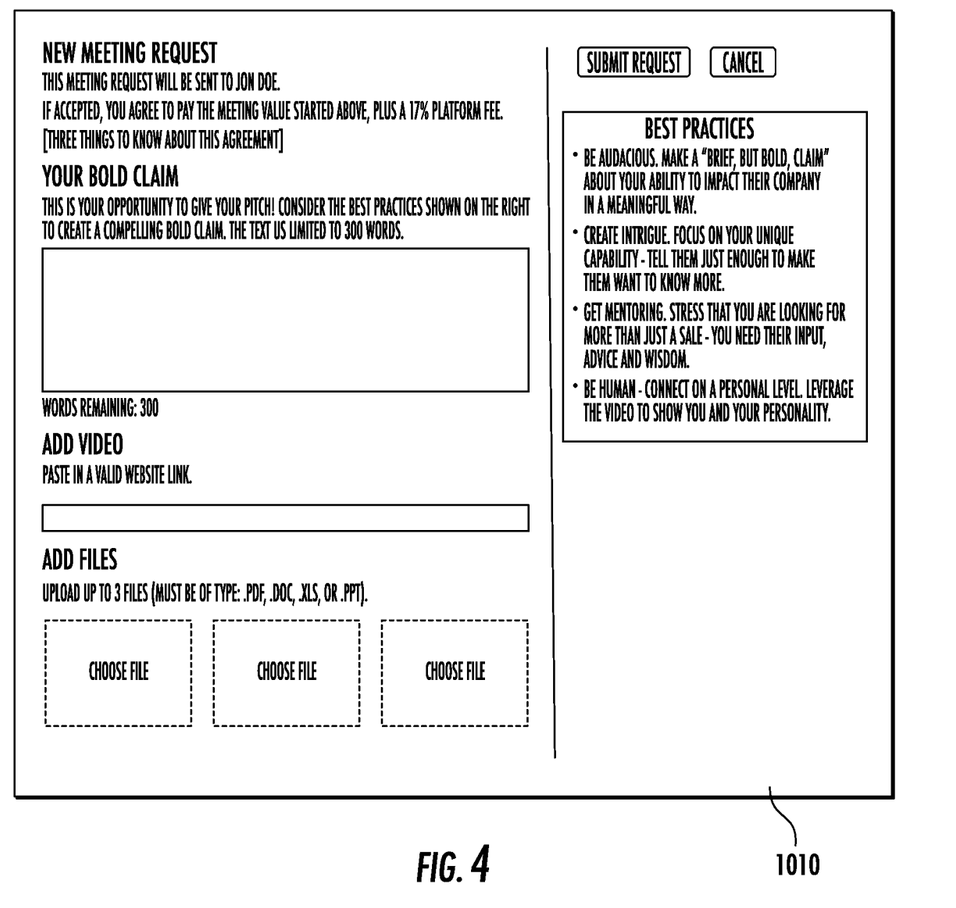
FIG. 4 depicts a New Meeting Request Input in an embodiment of the invention.

Submitting a Formatted Meeting Request. During the Submitting a Formatted Meeting Request step 1004, a Vendor User 14 submits a meeting request to the System 10 in a specified format. In an embodiment, the specified format is dictated by the System 10 in the form of a New Meeting Request Input 1010 as depicted in FIG. 4. More specifically, in the preferred embodiment, the Vendor User 14 submits the meeting request via a New Meeting Request Input 1010 in the format of: first, a bold claim, comprising a statement of three hundred or less words, presenting an argument for how the Vendor User 14 meets a specified Executive User's 12 needs and interests; second, a recorded video intended to introduce the Vendor User 14 to the Executive User 12 or provide visual information useful for helping the executive determine meeting appropriateness; and third, no more than three supporting documents containing evidence in support of the argument for how the Vendor User 14 meets a specified Executive User's 12 needs and interests. In an embodiment of the invention, the System 10 incorporates a New Meeting Request Input 1010 as depicted in FIG. 4.

In one embodiment of the invention, the presented format structure which is incorporated herein as a teaching of the one embodiment of the invention is intended to simplify and reduce the time needed for an Executive User 12 to verify meeting appropriateness so that the Executive User 12 can accept or reject each meeting request submitted by a Vendor User 14 to the Executive User 12 via the System 10 in under 5 minutes.

Figure 5:
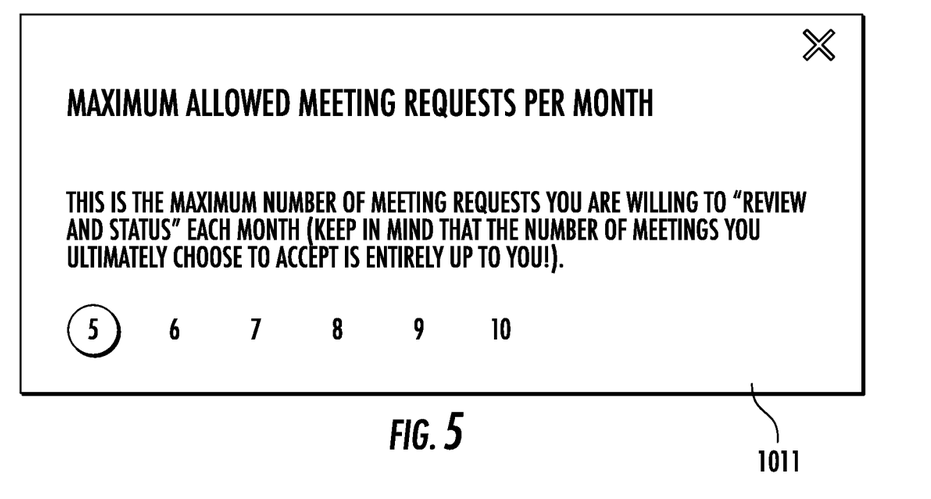
FIG. 5 depicts a Maximum Allowed Meetings Selector in an embodiment of the invention.

Limiting Requests Received. During the Limiting Requests Received step 1005, the Executive User 12 may restrict the number of meeting requests submitted from Vendor Users 14 to a maximum per month via a Maximum Allowed Meetings Selector 1011 incorporated into the System 10. Once the Executive User-12 specified maximum number of submissions is received by the Executive User 12 during a month, the System 10 disables the ability for any Vendor User 14 to make further submissions of meeting requests to that Executive User 12 until the following month. In an embodiment of the invention, the Maximum Allowed Meetings Selector 1011 is provided as depicted in FIG. 5.

Figure 6:
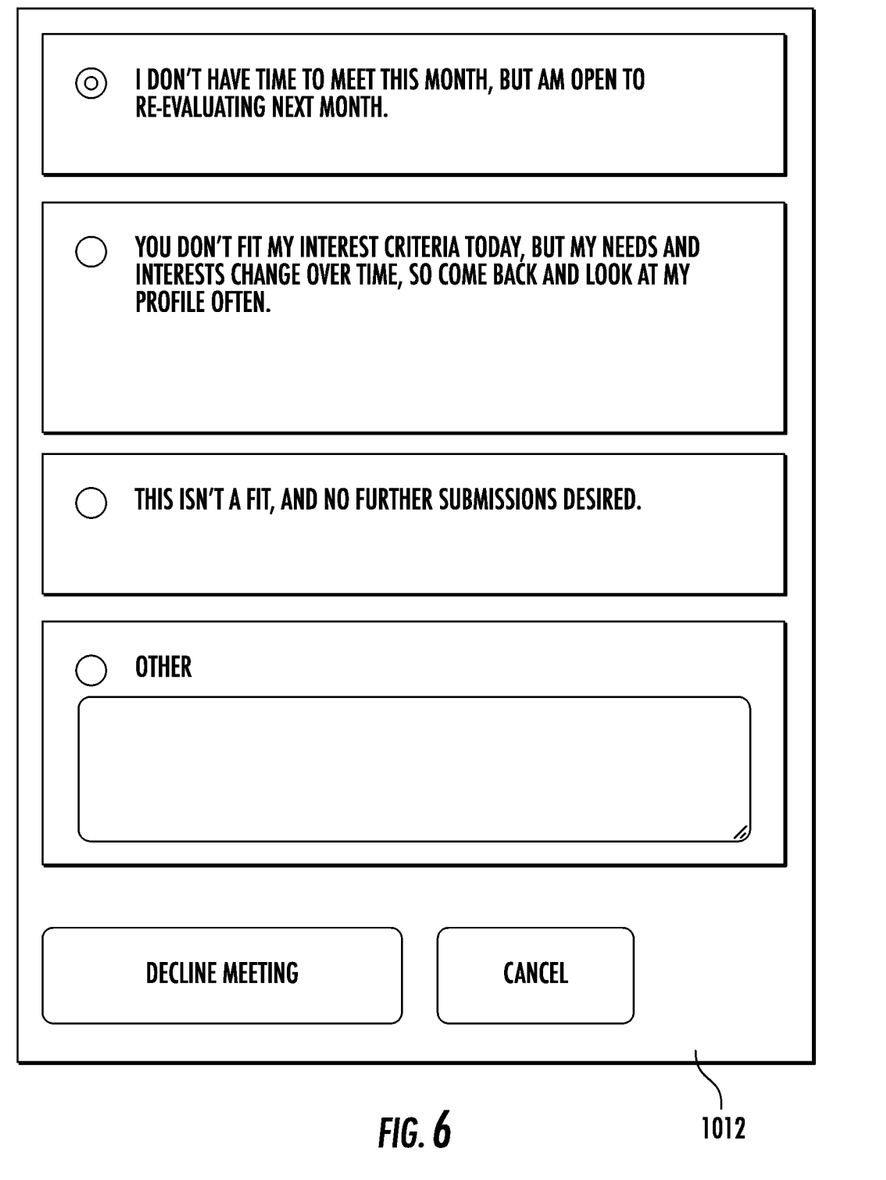
FIG. 6 depicts a Meeting Request Response Selector in an embodiment of the invention.

Deciding to Accept. During the Deciding to Accept step 1006, the Executive User reviews one or more meeting request submissions from Vendor Users 14. Based on whatever criteria chosen by the Executive User 12, the Executive User 12 either accepts or declines the one or more Vendor User 14 meeting request submissions utilizing a Meeting Request Response Selector 1012 incorporated into the System 10, as depicted in FIG. 6 in an embodiment of the invention. In an embodiment of the invention, the Meeting Request Response Selector 1012 incorporates three responses, indicating the following or similar options: (1) that the Executive User 12 is open to re-evaluating the requests next month, (2) that while interest criteria are not met today, the Executive User 12 would be open to considering the request if the Executive User's 12 needs and interests change in the future, and (3) that the Executive User 12 finds no value in the meeting request submission and therefore would not consider any future related submissions. In the case where the Executive User 12 decides to decline a meeting request submission by submitting a declined request, the Executive User 12 specifies the reason for declining within the Meeting Request Response Selector 1012 incorporated into the System 10. In an embodiment of the invention, the Meeting Request Response Selector 1012 is provided as depicted in FIG. 6.

Following the submission of a declined request to the System 10 by a Executive User 12 via the Meeting Request Response Selector 1012 incorporated into the System 10, the System 10 generates a message for delivery to the Vendor User 14 who submitted the then-declined request providing notification that the Vendor User's 14 meeting request has been declined and the Executive User's 12 specified reason for declining.

Figure 7:
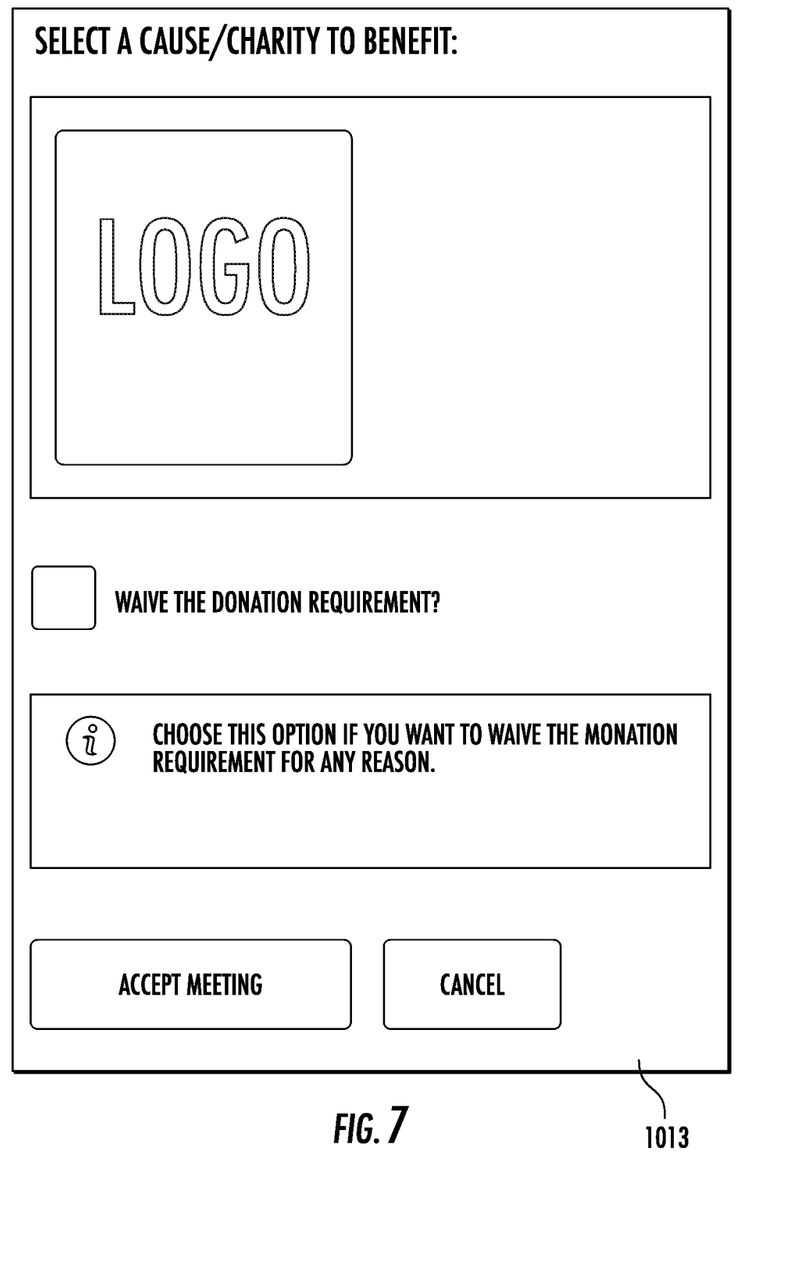
FIG. 7 depicts a Charity Selector in an embodiment of the invention.

In the case where the Executive User 12 decides to accept a meeting request by submitting an accepted request to the System 10, the Executive User 12 so indicates by selecting a charity 16, in one embodiment, which will benefit from the donation from within the Charity Selector 1013, or waiving the donation requirement, and accepting the meeting. The Charity Selector 1013 in an embodiment of the invention is depicted in FIG. 7.

Following the submission of an accepted request by an Executive User 12 to the System 10 via the Meeting Request Response Selector 1012 incorporated into the System 10, the System 10 generates a message for delivery to the Vendor User 14 who originally submitted the then-accepted request providing notification that the meeting request has been accepted. The notification is then sent to the Vendor User who submitted the request by the System 10.

Orchestrating Meeting. During the Orchestrating Meeting step 1007, the Vendor User 14 who submitted the then-accepted meeting request, following notification that the Executive User 12 would like to meet with the Vendor User 14, receives an invoice generated and delivered by the System 10. The System 10 then provides payment options and facilitates payment of the invoice in accordance with mechanisms well known by those skilled in the art. Following the Vendor User's 14 payment of the invoice, the System 10 displays contact and scheduling information to the Vendor User 14 for the Vendor User 14 to schedule the meeting.

Nominating a New Executive User. During the optional Nominating a New Executive User step, a Vendor User 14 utilizes the System 10 to notify a business leader who is not on the System 10 of their interest in meeting, their interest of supporting one of the business leader's charitable causes as part of the meeting process, the amount of funds that would be available for that cause, and the capability of the System 10 to manage the engagement process for this transaction. Related activities are facilitated by the system by the business leader who is not on the System 10 joining the System 10 as an Executive User 12. Embodiments are configured to provide an invitation for the business leader who is not on the System 10 to receive an invitation from the System 10, optionally delivered by e-mail, to allow the business leader who is not on the System 10 to join the System 10 in accordance with processes well understood by one skilled in the art.

Figure 8:
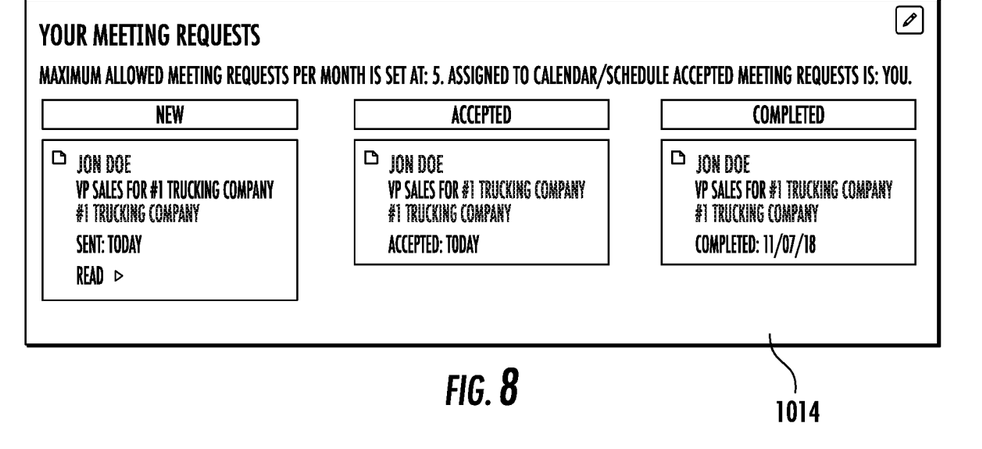
FIG. 8 depicts an Executive Vendor Solicitation Management Dashboard in an embodiment of the invention.

Executive Vendor Solicitation Management Dashboard. In an embodiment of the invention, the System 10 further comprises an Executive Vendor Solicitation Management Dashboard 1014. An embodiment of the Executive Vendor Solicitation Management Dashboard 1014 is depicted in FIG. 8. In an embodiment, the Executive Vendor Solicitation Management Dashboard 1014 provides visual capability and method for the Executive User 12 to receive automatic notifications of meeting requests, limit the number allowed, review and status the meeting requests, manage that Executive User's 12 meeting interest criteria, their meeting value and the charities with whom that Executive User 12 supports.

Figure 9:
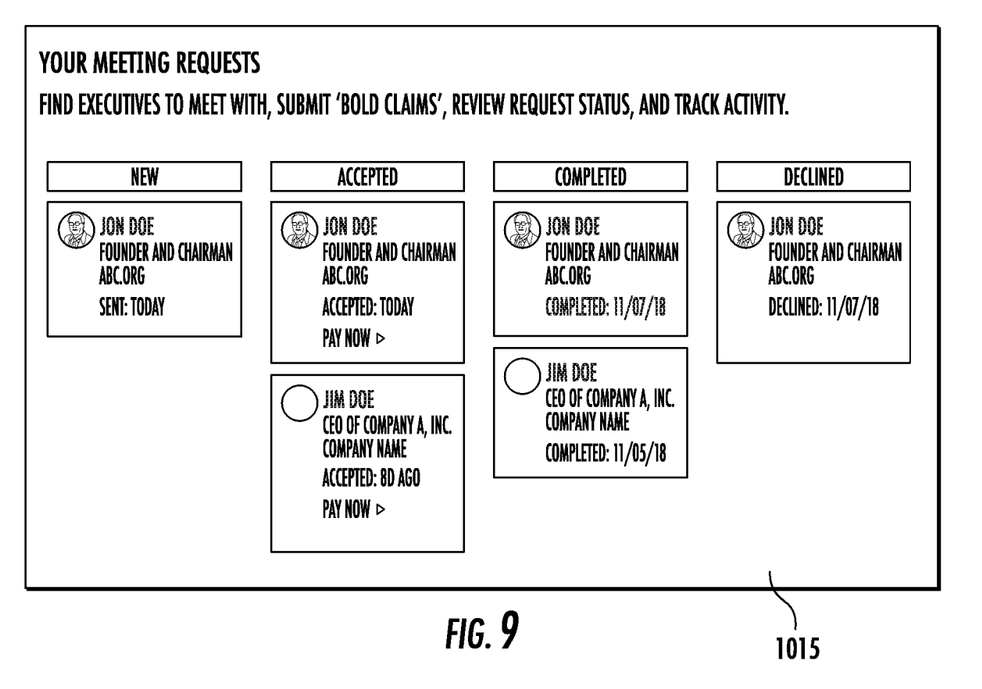
FIG. 9 depicts a Vendor Solicitation Management Dashboard in an embodiment of the invention.

Vendor Solicitation Management Dashboard. In an embodiment of the invention, the System 10 further comprises a Vendor Solicitation Management Dashboard 1015. An embodiment of the Vendor Solicitation Management Dashboard 1015 is depicted in FIG. 9. In an embodiment, the Vendor Solicitation Management Dashboard 1015 provides visual capability and method for a Vendor User 14 to review one or more Executive User 12 profiles, nominate new Executive Users 12 for inclusion within the system 10, submit and monitor the status of meeting requests, pay for accepted meeting requests, manage meeting requests in process, and notify system support staff of meeting problems.

In an embodiment of the invention, rather than providing opportunities for one or more vendors to connect with one or more Executive Users 12, the System 10 instead allocates mentorship opportunities whereby Vendor Users 14 are more accurately characterized as people seeking learning opportunities from the one or more Executive Users 12. The present inventors recognize that such a system 10 would have broad applicability to students and apprentices. In such configuration, the System 10 and associated methods are modified such that rather than transferring money to a third party charity 16, a platform fee is charged in consideration for making the connection. In an embodiment, the Executive Fee would have the ability to charge a platform fee every time one of those connections is made. In an embodiment, a portion of the platform fee would be transferred by the System 10 to the operators of the System 10. In such configuration of the System 10, no money would transfer to a charity. A student in the role of Vendor User 14, for instance, would pay a platform fee, but the Executive User 12 would simply choose to evaluate the merits of the student for a meeting without consideration of other contextual considerations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The terms "coupled" and "linked" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

What is claimed is:

1. A meeting solicitation management platform for helping at least one executive manage requests for their time by at least one vendor, comprising:
   at least one processor and memory coupled to the at least one processor;
   a meeting acceptance criteria filter executable by the at least one processor for filtering meeting requests for relevancy by providing the vendor details on the meeting interests and disinterests of the executive;
   a meeting value calculator executable by the at least one processor for helping the executive estimate an appropriate value for an hour of their time to be donated by the vendor wherein the appropriate value is based on a monetary amount other executives with similar titles and from similar size companies receive for an hour of their time;
   a new meeting request input executable by the at least one processor for allowing the vendor to provide a sufficient amount of information to the executive so that the executive can determine whether to accept a meeting with the vendor;
   a maximum allowed meetings selector executable by the at least one processor for limiting the number of meeting requests permitted during a selected period of time by vendors for review by the executive; and a charity selector executable by the at least one processor for allowing the executive to select which charity will receive the donation that the vendor will make when a meeting is accepted.

2. The platform of claim 1, the new meeting request input is configured to allow a vendor to provide a statement articulating why the vendor meets the executive's meeting interest and reason for the meeting, a video, and up to three supporting documents.

3. The platform of claim 2, wherein the bold claim consisting of a statement of three hundred or less words and presenting an argument for how the vendor meets a specified executive's needs and interests.

4. The platform of claim 1, wherein the recorded video is configured to introduce the vendor to the executive or provide additional context for the executive to make a meeting decision.

\* \* \* \* \*